(12) United States Patent
Merritt

(10) Patent No.: US 11,146,685 B1
(45) Date of Patent: *Oct. 12, 2021

(54) SYSTEM AND METHOD FOR AUTOMATICALLY ASSIGNING A CUSTOMER CALL TO AN AGENT

(71) Applicant: MASSACHUSETTS MUTUAL LIFE INSURANCE COMPANY, Springfield, MA (US)

(72) Inventor: Sears Merritt, Groton, MA (US)

(73) Assignee: MASSACHUSETTS MUTUAL LIFE INSURANCE COMPANY, Springfield, MA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/746,446

(22) Filed: Jan. 17, 2020

Related U.S. Application Data

(63) Continuation of application No. 15/726,952, filed on Oct. 6, 2017, now Pat. No. 10,542,148.
(Continued)

(51) Int. Cl.
*H04M 3/523* (2006.01)
*G06Q 10/06* (2012.01)
(Continued)

(52) U.S. Cl.
CPC ........... *H04M 3/5233* (2013.01); *G06N 7/08* (2013.01); *G06Q 10/0635* (2013.01);
(Continued)

(58) Field of Classification Search
CPC ........... H04M 3/5233; H04M 3/42068; H04M 2203/551; G06Q 30/0254; G06Q 10/0635
(Continued)

(56) References Cited

U.S. PATENT DOCUMENTS 5,519,773 A 5/1996 Dumas et al.
6,334,110 B1 12/2001 Walter et al.
(Continued)

FOREIGN PATENT DOCUMENTS

EP 2109302 B1 9/2010
WO 2009065052 A1 5/2009

OTHER PUBLICATIONS http://www.computer.org/csdl/proceedings/hicss/2001/0981/07/09817023.pdf Dawn Julia; Enabling and Measuring Electronic Customer Relationship Management Readiness; Proceedings of the 34th Hawaii International Conference on System Sciences—2001; Aug. 7, 2002; 10 pages.
(Continued)

*Primary Examiner* — Ahmad F. Matar
*Assistant Examiner* — Jirapon Intavong
(74) *Attorney, Agent, or Firm* — Foley & Lardner LLP

(57) ABSTRACT

Systems and methods described herein can automatically route an inbound call from an identified customer to one of a plurality of agents, the agent being selected on the basis of likelihood of a favorable outcome. The method determines a predictive model appropriate for the identified customer, with model variables including call center data, and targeted marketing data based upon risk data for the customer. An analytical engine calculates outcome predictions by applying the predictive model to values of model variables over a recent time interval. In a time-series analysis, this calculation is repeated while dynamically adjusting the recent time interval, until identifying a call routing option that satisfies a favorable outcome criterion. This method may be used to select the agent to handle the incoming call, and optionally to select a product for that agent to discuss with the identified customer.

20 Claims, 5 Drawing Sheets

Related U.S. Application Data

(60) Provisional application No. 62/407,336, filed on Oct. 12, 2016.

(51) Int. Cl.
*G06N 7/08* (2006.01)
*G06Q 30/00* (2012.01)
*G06Q 30/02* (2012.01)
*H04M 3/42* (2006.01)

(52) U.S. Cl.
CPC ..... *G06Q 10/06311* (2013.01); *G06Q 30/016* (2013.01); *G06Q 30/0254* (2013.01); *G06Q 10/063112* (2013.01); *H04M 3/42068* (2013.01); *H04M 2203/551* (2013.01); *H04M 2203/556* (2013.01)

(58) Field of Classification Search
USPC .................................................. 379/265.1
See application file for complete search history.

(56) References Cited

U.S. PATENT DOCUMENTS

| | | | |
|---|---|---|---|
| 6,389,400 B1 | 5/2002 | Bushey et al. | |
| 6,519,571 B1 | 2/2003 | Guheen et al. | |
| 6,879,683 B1 | 4/2005 | Fain et al. | |
| 6,959,080 B2 | 10/2005 | Dezonno et al. | |
| 7,023,979 B1 | 4/2006 | Wu et al. | |
| 7,035,811 B2 | 4/2006 | Gorenstein | |
| 7,103,562 B2 * | 9/2006 | Kosiba | G06Q 10/04 705/7.38 |
| 7,184,540 B2 | 2/2007 | Dezonno et al. | |
| 7,539,627 B2 | 5/2009 | Schmidt | |
| 8,054,964 B2 | 11/2011 | Flockhart et al. | |
| 8,126,712 B2 | 2/2012 | Mukaigaito et al. | |
| 8,296,160 B1 | 10/2012 | Pletz et al. | |
| 8,341,665 B2 | 12/2012 | Atsmon et al. | |
| 8,355,934 B2 | 1/2013 | Virdhagriswaran | |
| 8,687,776 B1 | 4/2014 | Reynolds et al. | |
| 8,737,595 B2 | 5/2014 | Chishti et al. | |
| 8,929,537 B2 | 1/2015 | Chishti et al. | |
| 9,008,283 B2 | 4/2015 | Riahi et al. | |
| 9,083,804 B2 | 7/2015 | Conway et al. | |
| 9,208,502 B2 | 12/2015 | Parikh et al. | |
| 9,215,323 B2 | 12/2015 | Chishti | |
| 9,582,786 B2 | 2/2017 | Gubin et al. | |
| 9,911,131 B1 | 3/2018 | Ross et al. | |
| 2004/0081311 A1 | 4/2004 | Thompson | |
| 2005/0195966 A1 | 9/2005 | Adar et al. | |
| 2006/0062374 A1 | 3/2006 | Gupta | |
| 2007/0136164 A1 | 6/2007 | Roti et al. | |
| 2008/0184270 A1 | 7/2008 | Cole et al. | |
| 2010/0020961 A1 | 1/2010 | Spottiswoode | |
| 2010/0332287 A1 | 12/2010 | Gates et al. | |
| 2011/0055098 A1 | 3/2011 | Stewart | |
| 2012/0166445 A1 | 6/2012 | Chakrabarti et al. | |
| 2012/0278388 A1 | 11/2012 | Kleinbart et al. | |
| 2014/0249873 A1 | 9/2014 | Stephan et al. | |
| 2014/0254790 A1 | 9/2014 | Shaffer et al. | |
| 2015/0106091 A1 | 4/2015 | Wetjen et al. | |
| 2015/0134325 A1 | 5/2015 | Skiba et al. | |
| 2015/0139416 A1 | 5/2015 | Skiba et al. | |
| 2015/0195406 A1 | 7/2015 | Dwyer et al. | |
| 2016/0071117 A1 | 3/2016 | Duncan | |
| 2017/0124581 A1 | 5/2017 | Wilson et al. | |

OTHER PUBLICATIONS http://www.genesys.com/solutions/customer-engagement/inbound/intelligent-voice-response Paula Bernier; Genesys Interactive Voice Response; copyright 2017; 3 pages.

http://www.genesys.com/solutions/employee-engagement/workforce-optimization/workforce-planning/speech-text-analytics Paula Bernier, Genesys Speech & Text Analytics; copyright 2017; 4 pages.

https://www.researchgate.net/publication/282976793_Automatic_Summarization_of_Call-center_Conversations Evgeny Stepanov <https://www.researchgate.net/profile/Evgeny_Stepanov> et al.; Automatic Summarization of Call-center Conversations; Conference: IEEE Automatic Speech Recognition and Understanding Workshop (ASRU 2015); Dec. 2015; 3 pages.

https://pdfs.semanticscholar.org/3803/10409dd7822c6007d5c76808b8c28698e2cd.pdf W.F. Cody et al., The integration of business intelligence and knowledge management; IBM Systems Journal, vol. 41, No. 4; 2002; 17 pages.

http://ieeexplore.ieee.org/abstract/document/6599389/ Gianmario Motta et al.; Forecasting in multi-skill call centers; 2013 Fifth International Conference on Service Science and Innovation (ICSSI); Oct. 24, 2013; 7 pages.

https://www.unc.edu/~haipeng/publication/poissonSVD.pdf Haipeng Shen et al.; Forecasting Time Series of Inhomogenous Poisson Processes with Application to Call Center Workforce Management; The Annals of Applied Statistics; Jul. 25, 2008; 25 pages.

Raquel Florez-Lopez et al. "Marketing Segmentation Through Machine Learning Models" An Approach Based on Customer Relationship Management and Customer Profitability Accounting, Social Science Computer Review OnlineFirst, published on Aug. 8, 2008 as doi:10.1177/0894439308321592, vol. XX, No. X.

Sara Costa, "Call Flow", https://support.talkdesk.com/hc/en-us/articles/206196766-Call-Flow, Jan. 18, 2018.

YongSeog Kim et al., "Customer Targeting: A Neural Network Approach Guided by genetic Algorithms", Management Science, vol. 51, No. 2, pp. 264-276, Feb. 2005.

Sanford Gayle, "The Marriage of Market Basket Analysis to Predictive Modeling", <http://ai.stanford.edu/~ronnyk/WEBKDD2000/papers/gayle.pdf>, Published 2000, 6 pages.

* cited by examiner

SYSTEM AND METHOD FOR AUTOMATICALLY ASSIGNING A CUSTOMER CALL TO AN AGENT

CROSS-REFERENCE TO RELATED APPLICATION

The present application is a continuation of U.S. Provisional patent application Ser. No. 15/726,952, filed Oct. 6, 2017, entitled "System and Method for Automatically Assigning a Customer Call to an Agent," which claims benefit of U.S. Provisional patent Application No. 62/407,336, filed Oct. 12, 2016, entitled "System and Method for Automatically Assigning a Customer Call to an Agent," the entire contents of which are hereby incorporated by reference.

TECHNICAL FIELD

The present disclosure relates generally to customer contact centers and their operation, and more particularly to a system and method for automatically assigning a customer call to an agent.

BACKGROUND

Customer contact centers, also herein called call centers, provide an important interface for customers/partners of an organization to contact the organization. The contact can be for a request for a product or service, for trouble reporting, service request, etc. The contact mechanism in a typical call center is via a telephone, but it could be via a number of other electronic channels, including e-mail, etc.

The typical contact center consists of a number of human agents, with each assigned to a telecommunication device, such as a phone or a computer for conducting email or Internet chat sessions, that is connected to a central switch. Using these devices, the agents are generally used to provide sales, customer service, or technical support to the customers or prospective customers of a contact center or a contact center's clients.

Typically, a contact center or client will advertise to its customers, prospective customers, or other third parties a number of different contact numbers or addresses for a particular service, such as for sales, for billing questions, or for technical support. The customers, prospective customers, or third parties seeking a particular service will then use this contact information, and the incoming caller will be routed at one or more routing points to a human agent at a contact center who can provide the appropriate service. Contact centers that respond to such incoming contacts are typically referred to as "inbound contact centers."

Conventionally, a contact center operation includes a switch system that connects callers to agents. In an inbound contact center, these switches route incoming callers to a particular agent in a contact center, or, if multiple contact centers are deployed, to a particular contact center for further routing. When a call lands at a contact center (which can be physically distributed, i.e., the agents may or may not be on a single physical location), it important to route the call to an appropriate call agent, and also to provide call agents with information that will enable the agent to handle the call more effectively.

In an example of conventional methods for routing an inbound call, if there are eight agents at a contact center, and seven are occupied with contacts, the switch will generally route the inbound caller to the one agent that is available. If all eight agents are occupied with contacts, the switch will typically put the contact on hold and then route it to the next agent that becomes available. More generally, the contact center will set up a queue of incoming callers and preferentially route the longest-waiting callers to the agents that become available over time. Such a pattern of routing contacts to either the first available agent or the longest-waiting agent is sometimes referred to as "round-robin" contact routing. In round-robin contact routing, eventual matches and connections between a caller and an agent are essentially random.

Some attempts have been made to improve upon these standard yet essentially random processes for connecting a caller to an agent. In some customer contact systems, calls are distributed based on static attributes of the caller (e.g., customer identifier), type of problem (typically obtained by prompting the caller to interact with the IVR system) and capability profile of the agents. Conventional contact center systems make only limited use of dynamic, time-dependent attributes used in agent selection, such as traffic parameters (load on an agent, time of day etc.), information on agent performance, or dynamic information on customers. The call assignment process typically is not informed by prior experiences the same or similar customers had with the same or similar agents.

SUMMARY

In an embodiment, a method of the present invention automatically assigns or routes an inbound call from a customer to one of a plurality of agents, the agent being selected on the basis of likelihood of a favorable outcome. The call routing procedure is effected promptly upon receiving the customer call, with no need for preliminary interaction with the customer before routing the call. The method calculates outcome predictions by applying one or more predictive models determined for the identified customer to model variables. In an embodiment, the method routes the identified customer to one of the plurality of agents only after identifying an agent for which the calculated outcome prediction satisfies a favorable outcome criterion. In an embodiment, the call routing procedure uses time-series analysis of time-dependent data for more efficient modeling outcome predictions for each a set of call routing options in order to select one of a plurality of agents with the most favorable outcome prediction.

The method of the invention calculates outcome predictions by applying the predictive model for the identified customer to dynamic model variables, i.e., model variables with values that change over time and/or model variables that include a plurality of instances at different points in time. In an embodiment, a model variable may represent call history data for the identified customer, the call history data including a plurality of customer interaction records recorded at different points in time. In this embodiment, each customer interaction record may include timestamp data, e.g., representative of the time of recording that record. In addition to calculating outcome predictions by applying the predictive model to dynamic model variables, the method may apply the predictive model to static model variables, i.e., model variables with a value or set of values that does not change over time.

In an embodiment, together with selecting an agent from the plurality of agents, the method selects a product from a plurality of products, e.g., for potential sale of the selected product to a prospective or existing customer. In an embodiment, the method provides the selected agent with information based upon the analysis used for selecting the agent to receive the call, to assist the agent in effectively handling the call.

In an embodiment, the method includes initially receiving a customer call for assistance, e.g., via telephone, the customer call including one or more customer identifier such as telephone number. Based upon the customer identifier, without requesting additional information from the customer, the method retrieves customer profile information for an identified customer from one or more internal databases of the call center, and/or one or more third-party databases.

In an embodiment, the retrieved customer profile information includes risk data associated with the identified customer. In an embodiment, the customer profile data includes call history data associated with the identified customer. In one aspect of this embodiment, the call history data includes one or more customer interaction records including timestamp data associated with each of the customer interaction records.

In an embodiment, the method also retrieves from an agent database, agent profile data for each of a plurality of agents.

In an embodiment, the predictive model includes model variables including the call history data having one or more customer interaction records, including timestamp data associated with each customer interaction record. In an embodiment, the predictive model also includes targeted marketing data associated with one or more product selected from a products database. In an embodiment, the one or more product is selected from the products database based upon the risk data associated with the identified customer.

In an embodiment, the method calculates outcome predictions for each a set of call routing options in order to select one of a plurality of agents with the most favorable outcome prediction. The method calculates outcome predictions by applying the predictive model determined for the identified customer to model variables, these model variables including the call center data and the targeted marketing data. In an embodiment, each call routing option comprises the identified customer, and one of the plurality of agents.

In an embodiment, the method routes the identified customer to one of the plurality of agents only after identifying an agent for which the calculated outcome prediction satisfies a favorable outcome criterion. For example, a given outcome prediction may represent likelihood of a given agent's closing a sale to the identified customer, and the favorable outcome criterion may comprise a minimum acceptable likelihood of this outcome. In another example, a given outcome prediction may represent likelihood of a favorable customer care service transaction to address risks represented by risk data associated with the given customer, and the favorable outcome criterion may comprise a minimum acceptable likelihood of this outcome.

In an embodiment, the method of the invention calculates outcome predictions by applying the predictive model to model variables over a recent time interval. In the case of dynamic model variables, the method applies the predictive model to values of the model variables during that recent time interval. In an embodiment, the method may repeat this calculation while iteratively adjusting the recent time interval to increase the recent time interval, until identifying an outcome prediction for one of the set of call routing options that satisfies the favorable outcome criterion. In one embodiment, the method uses time-series analysis methods to apply the predictive model over a series of time intervals in which successive recent time intervals within the series increase by a regular time increment, also herein called a rate.

This method of routing a customer to a call agent via dynamic calculation of outcome predictions, provides significant advantages. First, it improves the reliability of selecting a given call routing option, by providing flexible time frames for calculating outcome predictions. These flexible time frames can be critical to reliably satisfying the favorable outcome criterion, since a key value or instance of a dynamic model variable critical to a favorable outcome may have occurred at different points in time in the past.

Second, this method expedites routing the identified customer to a selected agent. The method only calculates outcome predictions based upon different values of dynamic model variables until it finds a time frame (i.e., a dynamically adjusted recent time interval) for which the calculation of outcome predictions identifies an outcome prediction for one of the call routing options that satisfies the favorable outcome criterion. As a result, the method can significantly reduce time required to query data and execute data-analysis algorithms.

In another embodiment, the method calculates outcome predictions for each of a set of call routing options in order to select one of a plurality of agents with the most favorable outcome prediction. Each call routing option comprises the identified customer, one of the plurality of agents, and a product selected from among a plurality of products. In this embodiment, the method routes the identified customer to a given agent only after identifying both a given agent and a given product, for which the calculated outcome prediction satisfies the favorable outcome criterion. In this embodiment, the method routes the identified customer to the one of a plurality of agents, while providing the agent with information on the selected product.

In an embodiment, a processor-based method comprises receiving a customer call, the customer call including a customer identifier for an identified customer; retrieving, by the processor from a customer relationship management database, customer profile data associated with the one or more customer identifier, wherein the customer profile data include risk data associated with the identified customer; and call history data associated with the identified customer, the call history data comprising one or more customer interaction records including timestamp data associated with each customer interaction record; retrieving, by the processor from an agent database, agent profile data for each of a plurality of agents; determining, by the processor, a predictive model appropriate to the identified customer, the predictive model including model variables comprising the call history data comprising the one or more customer interaction records including timestamp data associated with each customer interaction record, and targeted marketing data associated with one or more product selected from a products database based upon the risk data associated with the identified customer; calculating, by the processor, an outcome prediction for each of a set of call routing options by applying the predictive model to values of the model variables over a recent time interval, each call routing option comprising the identified customer and one of the plurality of agents; dynamically adjusting, by the processor in the event none of the outcome predictions calculated for the set of call routing options satisfies a favorable outcome criterion, the recent time interval in an increased recent time interval; repeating the calculating step by applying the predictive model to values of the model variables over the increased recent time interval; and routing, by the processor in the event the outcome prediction calculated for one of the set of call routing options satisfies the favorable outcome criterion, the customer call to the one of the plurality of agents comprised in the one of the set of call routing options.

In an embodiment, a processor-based method comprises receiving a customer call, the customer call including a customer identifier for an identified customer; retrieving, by the processor from a customer relationship management database, customer profile data associated with the identified customer, wherein the customer profile data include risk data associated with the identified customer, and call history data associated with the identified customer, the call history data comprising one or more customer interaction records including timestamp data associated with each customer interaction record; retrieving, by the processor from an agent database, agent profile data for each of a plurality of agents; determining, by the processor, a predictive model appropriate to the identified customer, the predictive model including model variables comprising the call history data comprising the one or more customer interaction records including timestamp data associated with each customer interaction record, and targeted marketing data associated with one or more product selected from a products database based upon the risk data associated with the identified customer; calculating, by the processor, an outcome prediction for each of a set of call routing options by applying the predictive model to values of the model variables over a recent time interval, each call routing option comprising the identified customer, the one of the plurality of agents, and one of the one or more product selected from the products database based upon the risk data associated with the customer; dynamically adjusting, by the processor in the event none of the outcome predictions calculated for the set of call routing options satisfies a favorable outcome criterion, the recent time interval to increase the recent time interval; repeating the calculating step by applying the predictive model to values of the model variables over the increased recent time interval; and routing, by the processor in the event the outcome prediction calculated for one of the set of call routing options satisfies the favorable outcome criterion, the customer call to the one of the plurality of agents comprised in the one of the set of call routing options, and reporting to the one of the plurality of agents information on the one of the one or more product comprised in the one of the set of call routing options.

In an embodiment, a system comprises a customer relationship management database that stores customer profile data associated with a plurality of customers; an agent database, that stores agent profile data for a plurality of agents; a predictive models module that stores a plurality of predictive models respectively associated with one or more of the plurality of customers; and a processor, configured to execute a call routing module, wherein the processor in communication with the non-transitory machine-readable memory and the call routing module executes a set of instructions instructing the processor to: receive a customer call, the customer call including a customer identifier for an identified customer; retrieve from the customer relationship management database the customer profile data associated with the identified customer; retrieve from the agent database the agent profile data for the plurality of agents; determine a given predictive model appropriate to the identified customer from the plurality of predictive models stored by predictive models module, the given predictive model including a plurality of model variables including one or more dynamic model variables; calculate an outcome prediction for each of a set of call routing options by applying the given predictive model to values of the model variables over a recent time interval, each call routing option comprising the identified customer and one of the plurality of agents; in the event none of the outcome predictions calculated for the set of call routing options satisfies a favorable outcome criterion, dynamically adjust the recent time interval to increase the recent time interval, and repeat the calculation of the outcome prediction by applying the given predictive model to values of the model variables over the increased recent time interval; and in the event the outcome prediction calculated for one of the set of call routing options satisfies the favorable outcome criterion, route the customer call to the one of the plurality of agents comprised in the one of the set of call routing options.

Other objects, features, and advantages of the present disclosure will become apparent with reference to the drawings and detailed description of the illustrative embodiments that follow.

BRIEF DESCRIPTION OF THE DRAWINGS

Non-limiting embodiments of the present disclosure are described by way of example with reference to the accompanying figures which are schematic and are not intended to be drawn to scale. Unless indicated as representing the background art, the figures represent aspects of the disclosure.

DETAILED DESCRIPTION

In the following detailed description, reference is made to the accompanying drawings, which depict non-limiting, illustrative embodiments of the present disclosure. Other embodiments may be utilized and logical variations, e.g., structural and/or mechanical, may be implemented without departing from the scope of the present disclosure. To avoid unnecessary detail, certain information, items, or details known to those skilled in the art may be omitted from the following description.

Figure 1:
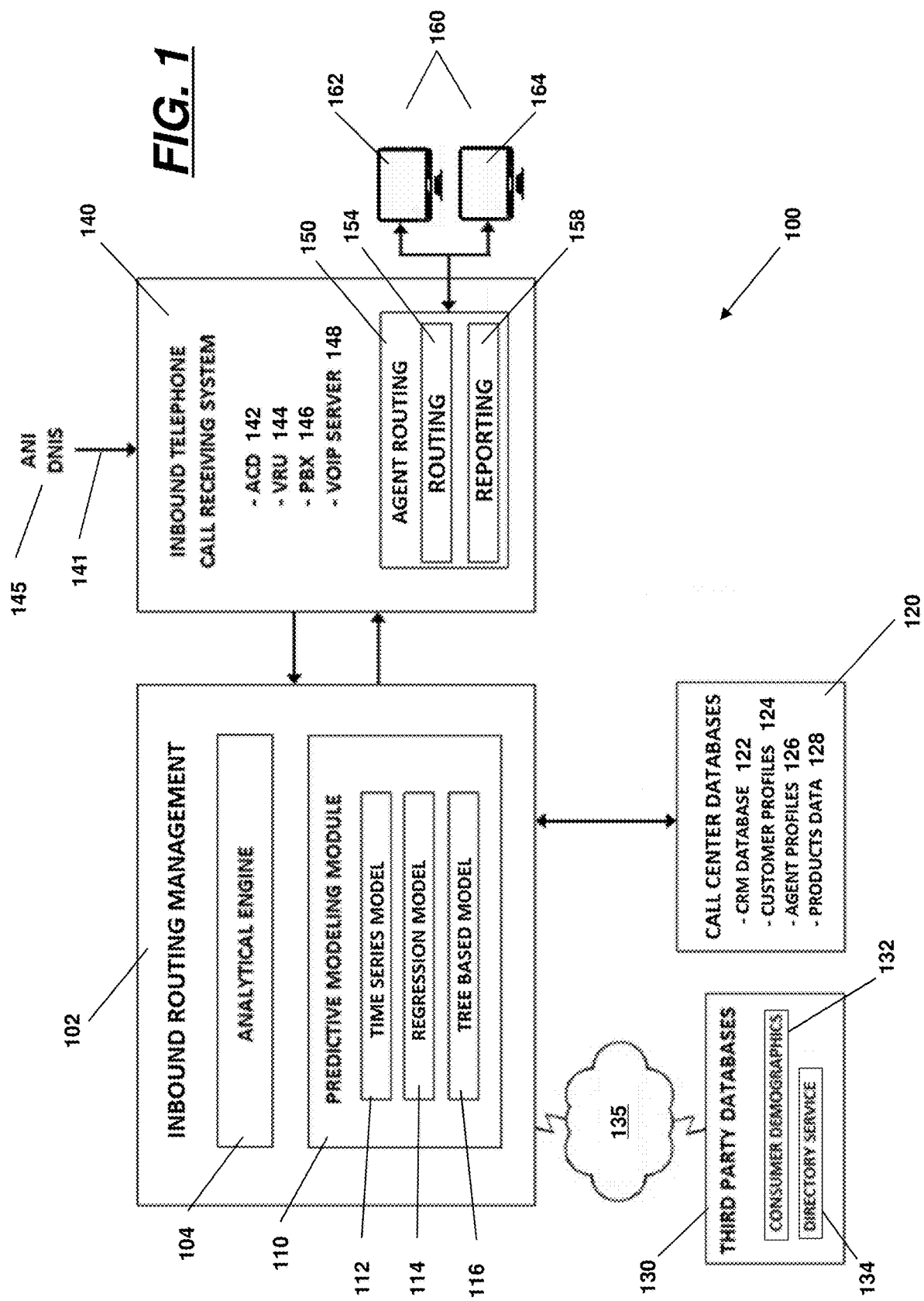
FIG. 1 is a system architecture for an inbound contact center for routing a customer call to an agent in accordance with an embodiment of the invention.

FIG. 1 shows a system architecture for a customer management system 100 of an inbound contact center, also herein called a call center, according to an illustrative embodiment. Customer management system 100 coordinates a group of communication channels and call center data resources for automatically routing an inbound customer call to one of a plurality of agents of the inbound contact center. In the architecture of FIG. 1, customers seeking sales transactions, technical support, information, follow-up sales, or other services, may contact the customer management system 100 through a variety of communication channels. The requested services may concern customer accounts such as policyholder accounts, customer relationship accounts such as registered software users, or other customer accounts. Customer management system 100 includes an inbound call routing management system 102, also called inbound routing management. Inbound routing management system 102 manages assignment of inbound telephone calls to automatically route calls to agents of the contact center, based on analysis of call center history data, customer and agent profiles, and other call center data, as well as third-party databases data concerning an identified customer. Inbound routing management system 102 includes an analytical engine 104, and a predictive modeling module 110 including a time-series module 112, a regression model 114 and a tree-based model 116.

Figure 5:
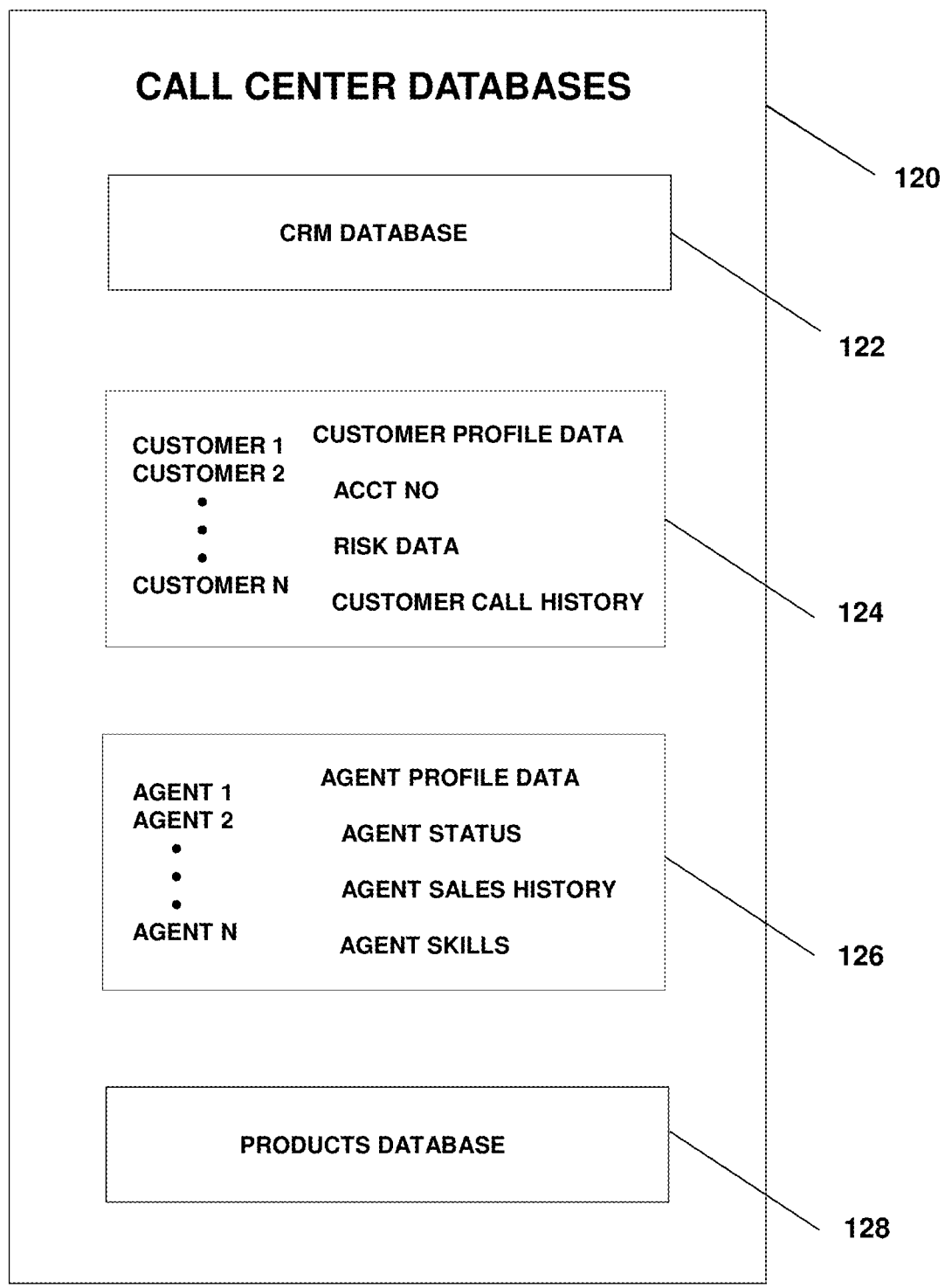
FIG. 5 is a block diagram illustrating component databases included in call center databases, according to the embodiment of FIG. 1.

Inbound call management system 102 is interfaced with one or more internal databases 120 of the inbound contact center. As shown in FIG. 5, call center databases 120 may include a customer relationship management (CRM) database 122, also herein called call history database. Call center databases further may include a customer profile database 124 and an agent profile database 126. Additionally, call center databases 120 may include a products information database 128.

Databases 120 are organized collections of data, stored in non-transitory machine-readable storage. In an embodiment, the databases may execute or may be managed by database management systems (DBMS), which may be computer software applications that interact with users, other applications, and the database itself, to capture (e.g., store data, update data) and analyze data (e.g., query data, execute data-analysis algorithms). In some cases, the DBMS may execute or facilitate the definition, creation, querying, updating, and/or administration of databases. The databases may conform to a well-known structural representational model, such as relational databases, object-oriented databases, and network databases. Exemplary database management systems include MySQL, PostgreSQL, SQLite, Microsoft SQL Server, Microsoft Access, Oracle, SAP, dBASE, FoxPro, IBM DB2, LibreOffice Base, FileMaker Pro.

In an embodiment, call center databases 120 use VERTICA® data warehouse software supplied by Vertica Systems, Inc., Andover, Mass. VERTICA® is a registered trademark of Hewlett Packard Enterprise Development, West Houston Tex. In an embodiment, databases 120 use rmm_analytics schema in VERTICA to generate data tables used by analytical engine 104 in calculating outcome predictions for each of a plurality of routing options, such as tables of historical customer data, and tables of agent performance data.

Analytical engine 104 can be executed by a server, one or more server computers, authorized client computing devices, smartphones, desktop computers, laptop computers, tablet computers, PDAs and other types of processor-controlled devices that receive, process, and/or transmit digital data. Analytical engine 104 can be implemented using a single-processor system including one processor, or a multi-processor system including any number of suitable processors that may be employed to provide for parallel and/or sequential execution of one or more portions of the techniques described herein. Analytical engine 104 performs these operations as a result of central processing unit executing software instructions contained within a computer-readable medium, such as within memory. In one embodiment, the software instructions of the system are read into memory associated with the analytical engine 104 from another memory location, such as from storage device, or from another computing device via communication interface. In this embodiment, the software instructions contained within memory instruct the analytical engine 104 to perform processes that are described in FIGS. 2 and 3 below. Alternatively, hardwired circuitry may be used in place of or in combination with software instructions to implement the processes described herein. Thus, implementations described herein are not limited to any specific combinations of hardware circuitry and software.

Inbound call routing management system 102 communicates with CRM database 122. CRM database 122 stores, for example, customer history data associated with given customers, such as sales history information, service information, and account usage information. In an embodiment, call history data comprises one or more customer interaction record, wherein each customer interaction record includes associated timestamp data. Timestamp data may include data on date and time-of-day identifying, e.g., date and time of each given customer interaction with the contact center.

Inbound call routing management system 102 also includes or communicates with customer profile database 124, which stores data for a plurality of customers Customer_1, Customer_2, . . . , Customer_N of the call center. Customer profile database 124 can track both existing customers of the call center's organization, and prospective customers or leads. Customer profile data 124 includes, for example, records of individual customer account information such as customer name, address information, telephone number information, credit card number, and other data fields to assist in customer care and value-added promotions related to the organization's set of customer accounts. Basic customer profile information can include customer demographic and psychographic characteristics that may affect affinity of given agents to that customer (customer-agent affinity). Customer profile data 124 also can includes risk data associated with given customers.

Inbound call routing management system 102 also includes or communicates with agent database 126, which stores, among other data, agent profile data 126 for a plurality of agents Agent_1, Agent_2, . . . , Agent_N of the contact center. Agent profile data 126 includes, for example, agent ID, basic agent profile information, agent status data, agent sales history, and agent skills. Agent status may include information on years of experience, seniority, authorizations, etc. Basic agent profile information can include agent demographic and psychographic characteristics that may affect customer-agent affinity. Agent sales history may include aggregate sales productivity metrics, as well as distributed performance metrics such as sales metrics by product types, by customer types, etc. Agent skills may include training and certifications, licenses received, as well as information on "soft skills" affecting customer-agent communications.

Additionally, inbound call routing management system 102 includes or communicates with products database 128, which stores, among other data, a catalog of products, which may include also services, sold or supplied by the call center's organization. In an embodiment, products data in database 128 includes information on customer risks. Products and services tracked in products database 128 may be particularly timely or appropriate in view of given customer risk data. For example, risk data in customer profile data 128 may include data on life events (whether past, current, or future) of given customers and their family members.

In an embodiment, risk data for a plurality of customers and products (e.g., insurance policies) of the company is stored in the products database 128. In another embodiment, customer management system 100 also includes or communicates with a risk database (not shown). Risk data include data collected in assessing and monitoring risks associated with customers and classes of customers of the call center's organization. In an embodiment in which the call center organization is an insurance company or financial services company, existing customers of the company include policyholders or insured parties. In this embodiment, risk data include a plurality of risk variables associated with a plurality of insured parties. Risk variables might be associated with, by way of examples only, wage information, prior indemnity claim frequency data, geographic information, an industry classification, prior medical claim frequency, and business credit.

Risk data also can include time-based data (dynamic variables) on customer circumstances that can result in customer needs, e.g., needs for insurance or other financial products tracked in products database 128. Risk data relating to customer needs may be associated with key times and life events of a customer. Certain life events can result in abrupt changes to customer needs. An example is purchase of a home, resulting in a need for mortgage insurance. Additionally, risk data relating to customer needs may exhibit trends, i.e., needs that increase and/or decrease over time. An example is age of a family member, which can be related to trends in needs for financial products, e.g., as the family member approaches college age. In an embodiment, customer management system 100 tracks targeted marketing data associated with one or more of the products in products database 128 based upon such risk data relating to customer needs.

In an embodiment, analytical engine 104 interacts with external services, applications, and databases, such as third-party databases 130, through one or more application programmable interfaces, an RSS feed, or some other structured format, via communication network 135. In the embodiment of FIG. 1, inbound routing management system 102 retrieves data from one or more third-party databases 130, including a consumer demographics database 132 and a directory service database 134.

In an exemplary embodiment, customer demographics data 132 used in predictive modeling of outcomes also include data retrieved from ACXIOM® customer demographics database maintained by Acxiom Corporation, Little Rock Ark., to obtain information about customers or leads. ACXIOM® is a registered trademark of Acxiom Corporation. In an embodiment, Acxiom customer demographics data include individual-level data on customers or leads. In various embodiments, as a prerequisite to using Acxiom data in predictive modeling of a given inbound caller, analytical engine 104 associates the Acxiom data with a customer identifier for the caller. In an exemplary embodiment, Acxiom customer demographics data used in predictive modeling of an inbound caller requires an exact match of name and address.

In an embodiment, Acxiom customer demographics data also include data using zip-level features of the Acxiom system, which provide a coarser representation in building the predictive model. Such zip-level features employ variables in Acxiom that have resolution at the zip-level for each individual in the zip code. In an exemplary embodiment, zip-level data for individual income is associated with a zip code median value in Acxiom.

Inbound routing management system 102 interfaces with an inbound telephone call receiving system 140. In customer management system 100, inbound routing management system 102 and call receiving system 140 may be integrated in a single computing platform. Alternatively these systems may be based on separate computing platforms. In certain embodiments, the computing platform(s) are interfaced with computer-telephone integration ("CTI") middleware such as CT Connect®, or the Telephony Application Programming Interface (TAPI) of Microsoft Corporation. CT Connect is a registered trademark of Enghouse Interactive Inc., Phoenix Ariz. In an embodiment, inbound telephone call receiving system 140 includes a telephony device that accepts inbound telephone calls through a telephony interface 141, such as conventional T1 or fiber interfaces. Inbound telephone call receiving system 140 accepts inbound telephone calls through interface 141 and obtains caller information associated with the inbound calls, such as Automatic Number Identification ("ANI") and Dialed Number Identification Service ("DNIS") information 145. ANI is a signaling system feature in which a series of digits, either analog or digital, are included in the call identifying the source telephone number of the calling device. DNIS is a telephone function that sends the dialed telephone number to an answering service. The DNIS need not be a telephone number associated with any physical location.

Inbound telephone call receiving system 140 may include an Automatic Call Distributor ("ACD") system 142; a Voice Response Unit ("VRU") system 144; a private branch exchange ("PBX") switch 146; a Voice over Internet Protocol ("VOIP") server 148; or any combination of such devices. In an embodiment, intrasite telephony access within the call center may be managed by a private branch exchange (PBX) switch 146. In an embodiment, PBX switch 146 operates in coordination with ACD 142 to distribute inbound calls customer service stations locally networked call center agents 160, such as agents deployed at workstations or agent devices 162, 164.

In the present disclosure, an identified customer is an inbound caller for which the customer management system 100 has obtained reliable identifying data. This data is used by inbound queue management system 102 to retrieve or identify data associated with that customer. In an embodiment, an identified customer is a customer for which the system 100 has reliably identified at least two of name, address, and zip code. In an embodiment, a customer is identified based upon a customer identifier such as a telephone number extracted by the customer management system 100 from the inbound communication. In the automated call routing method of the present disclosure, it is not necessary for the customer to provide additional customer information (e.g., via interaction with VRU module 144) in order to route the customer's call. Based upon the customer identifier, customer management system 100 looks up customer profile data 122 for a given customer (herein sometimes called an identified customer).

In an embodiment, inbound call routing system 102 communicates with a third-party directory service 134, such as the WhitePages® online directory service. WhitePages is a registered trademark of WhitePages, Inc., Seattle Wash. Directory service 134 can provide additional caller identification information, such as name and address information, for inbound callers that are initially identified only by a telephone number.

Within the customer management system 100, inbound customer calls are routed to an agents community 160. Agents 160 may be a group of customer service representatives or agents deployed at workstations or agent devices (e.g., 162, 164) communicatively coupled to inbound telephone receiving system 140. In an embodiment, the agent community 160 comprises representatives or agents associated with an organization that sells or supplies products tracked in products database 128.

In various embodiments, the sponsoring organization for customer management system 100 is an insurance company or other financial services company, and agents 160 may include insurance agents. In some cases, an insurance agent may be associated with only a single insurance provider (sometimes referred to as a "captive" insurance agent). In other cases, an "independent" insurance agent may be associated with several different insurance providers. An insurance agent might refer to a physical office wherein an agent may operate alone, or may instead have many producers in the office who are licensed to sell insurance. In some cases, the producers may be licensed to sell different types of insurance products, might have different areas of expertise, needs, etc. In these embodiments, the present system and method provides techniques for efficiently routing customer calls to insurance agents with suitable expertise, licenses, etc. to effectively address the needs of identified customers.

In an embodiment, a routing segment 154 of agent routing module 150 routes an inbound customer call to one of the agent devices 162, 164 as instructed by analytical engine 104. The customer management system 100 can generate graphical user interfaces on the agent devices 162, 164 to facilitate interaction with the customer management system 100, and to perform associated data acquisition and processing functionalities. These interfaces can be implemented within an operating system, a discrete GUI software layer, an application program, or any combination thereof.

In an embodiment, graphical user interfaces generated by analytical engine 104 on the agent devices 162, 164 include customer service dashboards received from a reporting segment 158 of agent routing module 150. In an embodiment, customer service dashboards incorporate customer profile data from customer profile module 124, customer demographics data from third-party customer demographics database 132, products data from products database 128, and call routing analytics generated by analytical engine 104. As described below with reference to FIG. 4, graphical user interfaces generated by customer management system 100 may present various forms within a customer service dashboard, such as tables, charts, and other graphical formats.

In an embodiment, agent devices 162, 164 communicate with the inbound call receiving system 140 through a network (not shown). Embodiments of a network may vary in the components included based on the technology implemented and the relative locations of the agent devices and the application server hosting the customer management system 100. It is to be appreciated that the network may be a public network, such as the Internet, or a private network that may be logically isolated from the Internet.

In the embodiment described here, analytical engine 104 receives call history data 122, customer profile data 124 and third-party demographics data 132 for an identified customer, agent profile data 126 for a plurality of agents of the contact center, and data 128 for one or more products. In conjunction with predictive modeling module 110, analytical engine 104 processes the received data, and may store the processed data in updating one or more of these databases and/or in updating predictive models within the predictive modeling module 110. As a key function of the present system and method, analytical engine 104 calculates outcome predictions for each of a plurality of routing options in order to automatically route the customer call to one of the routing options based upon these calculations.

Outcome predictions generally quantify or otherwise represent likelihood and/or value of favorable outcomes. Favorable outcomes depend on the goals of the call center's organization, and may include, e.g., increasing the likelihood of sales transactions, increasing the financial value of sales, decreasing the duration of contact center contacts (and hence the cost to the contact center), and achieving an acceptable level of customer satisfaction. Favorable outcomes also may include operational goals of the call center, such as collecting additional customer profile data from a lead that would increase the likelihood of a future sales transaction. In this case, when routing that lead's call to an agent, the customer management system 100 can prompt the agent to obtain the additional customer profile data from the lead.

Analytical engine 104 is communicatively coupled to predictive modeling module 110, also herein called predictive models module. Analytical engine 104 processes predictive models data received from module 110 in calculating outcome predictions for each of a plurality of routing options. In an embodiment, the predictive-models module stores a plurality of predictive models wherein given predictive models may be adapted for different types of favorable outcomes, among other parameters. In an embodiment, the method establishes a measurable criterion for successful achievement of a defined favorable outcome, herein sometimes called favorable outcome criterion. For example, a favorable outcome criterion may be a minimum acceptable likelihood of completion of a defined sales transaction.

Predictive modeling module 110 builds one or more models that predict customer attributes such as likelihood that the customer will purchase a product offered by the call center, and that predict agent attributes such as sales performance. In various embodiments, agent attributes may be correlated with customer attributes, e.g., agent performance data may be correlated with customer demographics. The predictive modeling module analyzes each inbound customer call using data associated with a customer identifier for the inbound caller. In various embodiments, data used in predictive modeling is retrieved from one or more of call center databases 120 and third-party databases 130. Data used in predictive modeling also may include data that has been transformed by analytical engine 104 in order to facilitate predictive modeling. Based on the predictive modeling by models within predictive modeling module 110, analytical engine 104 calculates outcome predictions for each of a plurality of routing options, i.e., options for routing an identified customer to different agents 162, 164, etc. of the call center.

In an embodiment, predictive models within module 110 include a time-series model 112, which is designed to efficiently calculate outcome predictions based upon data retrieved from internal databases 120 and third-party databases 130. Typically, conventional time series analysis seeks to discover a pattern in historical data, referred to as a time series, in order to extrapolate the pattern into the future. However, the time series analysis of the present disclosure has a different purpose, i.e., to provide an efficient chronological framework for regression predictive modeling and tree based predictive modeling.

In an embodiment, time-series model 112 selects time-dependent data as a preliminary step for processing the selected data by regression module 114 and/or by tree-based module 116. Examples of time-dependent data include time-stamped transactions of the call center in call history database 122; time-dependent life history events of a customer in customer profile database 124; time-stamped performance data for an agent in agents profile data; and time-stamped events such as payment deadlines for products in products database 128. Similarly, many customer demographics data in third-party databases 132 may comprise time-stamped data.

In an embodiment, time-series module 110 selects data retrieved from databases 120, 130 to generate Markov models. Markov models reflect that a customer's predicted behavior state relevant to a desired favorable outcome may not be directly observable. In an embodiment, the present system and method uses indirect predictive models, such as hidden Markov models, to predict the customer's behavior states and transitions in these behavior states. Hidden Markov Models (HMMs) are a popular tool to model time-series data and are widely used in fields such as speech recognition and bioinformatics. While modeling the data using HMMs, it is assumed that there is an underlying Markov process that generates the hidden state sequence, wherein observations are made at regular intervals conditioned on these states. In one embodiment, the time-series data is a sequence taken at successive equally spaced points in time. In this embodiment, the present method applies a Markov predictive model over a time series in which successive recent time intervals within the series increase by a standard time increment, herein called a rate. The rate can vary depending on specifics of the model, e.g., shorter time periods for dynamic short-term models and longer time periods for longer-term models.

In an embodiment, the predictive models in module 110 further include a regression module 114. In an embodiment, regression module 114 applies regression analysis to various types of model variables, such as model variables pertaining to call center history; model variables pertaining to risk data; and model variables pertaining to targeted marketing to different types or groups of customers. In an exemplary embodiment, in which customer demographics data 132 used in predictive modeling includes data retrieved from the ACXIOM customer demographics database, the predictive modeling module 110 trains a logistic regression model 114 with the full set of features of the ACXIOM database.

Examples of model variables relating to call center history include: time since last call; mean duration of call center call; and call center agent. In an embodiment, the call center history comprises one or more customer interaction records for a given customer, or a given group of customers, including timestamp data associated with each customer interaction record.

Examples of model variables relating to risk data include: policy risk class; health risk variables measured through lab tests such cholesterol, albumin, and glucose levels; and behavioral variables such as motor vehicle violation history, and credit risk.

Examples of model variables relating to targeted marketing to different groups of customers include: customer product preferences; household income; marital status; and geographic location. In an embodiment, targeted marketing data includes products data based upon risk data associated with given customers or classes of customers, such as customers in a given risk class.

In an embodiment, predictive modules 110 further include a tree-based module 116. In an embodiment, the tree-based model 116 is a random-forests model. Random forests is a class of ensemble methods used for classification problems. Random-forests models work by fitting an ensemble of decision tree classifiers on sub samples of the data. In an embodiment, each tree uses only a limited number of features. By averaging the output of classification across the ensemble, the random-forests model can limit over-fitting that might otherwise occur in a decision tree model. In an embodiment, the random decision forests ensemble learning method ranks the importance of model variables in the predictive model. This procedure can be used to train a decision tree or regression tree to determine the effect of model variables on outcome predictions.

In an embodiment, analytical engine 104 is communicatively coupled to an agent routing module 150 within the inbound telephone call receiving system 140. Analytical engine 104 instructs agent routing module 150 to route a call from an identified customer to one of the agents 162, 164, etc. in agents community 160 in the event the analytical engine determines that one of the call routing options including that agent satisfies a favorable outcome criterion. In one embodiment, agent routing module 150 routes an identified customer to one of the agents 162, 164, upon identifying the first agent that is associated with an outcome prediction that satisfies a favorable outcome criterion. In another embodiment, agent routing module 150 routes an identified customer to one of the agents 162, 164 that is associated with an outcome prediction, and sends the selected agent a report that includes information on a product that is included in the call routing option.

Figure 2:
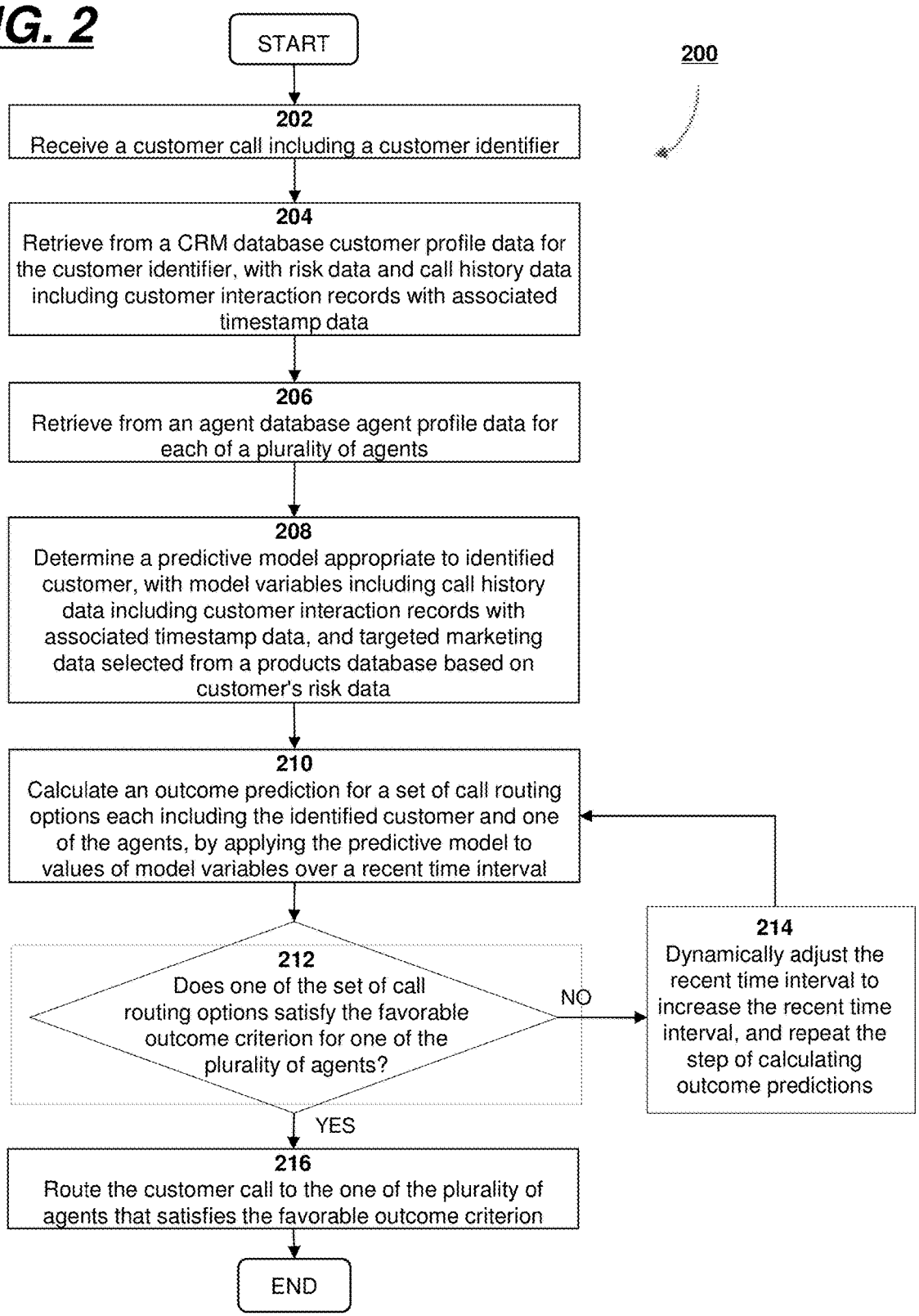
FIG. 2 illustrates a method for routing a customer call to an agent in accordance with an embodiment of the invention.

FIG. 2 is a flowchart showing a call management process 200 for automatically assigning or routing an inbound call from a customer to one of a plurality of agents at a contact center, according to an exemplary embodiment. Upon identifying the customer, the process calculates outcome predictions for a plurality of call routing options each including the identified customer and one of the plurality of agents. In the event the process determines that one of the call routing options satisfies a favorable outcome criterion, the process routes the inbound call to the agent associated with the successful call routing option. In an embodiment, calculation of outcome predictions uses Markov processing, repeated over a series of recent time intervals in which the Markov model dynamically adjusts a recent time interval to increase the recent time interval, until one of the call routing options successfully meets the favorable outcome criterion.

In an embodiment, the plurality of steps included in process 200 may be performed by one or more computing devices or processors in the customer management system of FIG. 1. In an embodiment, the plurality of steps included in process 200 may be performed by customer management system 100 of a contact center, in operative communication with a customer 102.

The call management process 200 is initiated at step 202 in response to the customer management system 100 receiving an incoming customer call associated with a customer identifier. Customers may dial into the system through a public switched telephone network or via through intrasite telephony. Additionally, inbound calls may be transmitted via the Internet using Web-enabled browsers, personal digital assistants or other network-enabled devices; via mobile cellular telephones (not shown), which may be Web-enabled, or connected via a mobile switching center. In an embodiment, customer management system 100 receives the inbound call via an IVR module or other contact center interface for call forwarding, queuing and similar functions known in the art.

At step 204, the method retrieves customer profile data from a customer relationship management (CRM) database, such as CRM database 122, the customer profile data including the customer identifier associated with the incoming call ("identified customer"). For example, the customer profile data may include data associated with a given customer account (e.g., indexed by an account number), wherein customer contact information for that customer account includes the given customer identifier. Customer profile data for the identified customer can include basic account information such as customer name, address information, telephone number information, credit card number, and other data fields to assist in customer care.

In one embodiment of step 204, the identified customer is an existing customer of the call center's organization. In another embodiment, the identified customer is a prospective customer of the call center's organization that has registered with or opened an account with the customer management system.

At step 204 the method retrieves other customer profile data associated with the identified customer to facilitate routing the customer to an appropriate call center agent, including risk data and call history data; e.g., from customer profile database 124. Advantageously the call history data includes customer interaction records, wherein given customer interaction records are associated with respective timestamp data. In an embodiment, timestamp data may include data on date and time-of-day identifying, e.g., date and time of each given customer interaction with the contact center.

Additionally, customer profile data retrieved at step 204 may include products and/or services of the organization of known interest or potential interest to the identified customer, e.g., based upon the risk data. Retrieved customer profile data can include purchase history for existing customers, and data indicative of purchase propensity for prospective customers.

Retrieved customer profile data also can include customer demographic and psychographic characteristics that may affect affinity of given agents to that customer (customer-agent affinity).

At step 206, the method retrieves from an agent database (e.g., agent profile database 126), agent profile data for each of a plurality of agents of the contact center. Agent profile data may include, for example, agent ID, basic agent profile information, agent status data, agent sales history, and agent skills. Agent status may include information on years of experience, seniority, authorizations, etc. Basic agent profile information can include agent demographic and psychographic characteristics that may affect customer-agent affinity.

Agent sales history may include aggregate sales productivity metrics, as well as distributed performance metrics such as sales metrics by product types, by customer types, etc. For example, given agents may have a particularly strong sales history with certain types of customer, and/or in selling or servicing certain types of products. Agent skills may include training and certifications, and licenses received. For example, given agents may have strong training and experience in certain skill areas that match a stated need of the identified customer. Agent skills also can include "soft skills" affecting customer-agent communications, such as demonstrated ability to solve customer problems in a single call.

At step 208, the method determines a predictive model appropriate to the identified customer. In an embodiment, the predictive model includes model variables including call history data embodying one or more customer interaction records having timestamp data. In an embodiment, the predictive model includes targeted marketing data. In one embodiment, the targeted marketing data is selected from a products database based upon the risk data associated with the customer. In a further embodiment, the predictive model includes model variables directly corresponding to risk data for the customer.

In an embodiment, the predictive model is a Markov model. In an embodiment, the predictive model includes dynamic model variables. The dynamic model variables may change value over time, may comprise a series of instances over different points in time, or both. In an embodiment, the predictive model also includes static model variables, i.e., model variables with a value or set of values that does not change over time.

At step 210, the method calculates an outcome prediction for a set of call routing options by applying the predictive model determined at step 208, to values of model variables. Each call routing option includes the identified customer, and one of the agents. In an embodiment, the method applies the predictive model to values of the model variables over a recent time interval.

In an embodiment, at step 210 the customer management system queries one or more internal databases for values of the model variables, and executes data-analysis algorithms based on the predictive model in order to calculate outcome predictions for the call routing options during the recent time interval. In another embodiment, at step 210 may, in addition to querying internal databases of the contact center, query one or more external database to obtain values of one or more model variable during the recent time interval.

In various embodiments of step 210, calculated outcome predictions quantify or otherwise represent likelihood and/or value of favorable outcomes. Favorable outcomes depend on the goals of the call center's organization, and may include, e.g., increasing the likelihood of sales transactions, increasing the financial value of sales, decreasing the duration of contact center contacts (and hence the cost to the contact center), and providing for an acceptable level of customer satisfaction.

At step 212, for the outcome predictions calculated for the series of call routing options during the recent time interval at step 210, the method determines whether one of these outcome predictions satisfies favorable outcome criterion included in the predictive model. In an embodiment, the favorable outcome criterion provides a measurable criterion for successful achievement of a defined favorable outcome. An example of a favorable outcome criterion is a minimum acceptable likelihood of completion of a defined sales transaction.

If at step 212, none of the outcome predictions satisfies the favorable outcome criteria included in the predictive model ("one of the calculated outcome predictions satisfies the favorable outcome"=NO), at step 214 the method dynamically adjusts the recent time interval to increase the recent time interval, e.g., by a standard time increment or rate. The method then repeats step 210 to re-calculate outcome predictions for each of the call routing options over the new (increased) recent time interval. Considered as a "do loop," steps 210-212-214 execute a time-series analysis of model variables based upon the predictive model determined at step 208, until the exit condition is satisfied ("one of the calculated outcome predictions satisfies the favorable outcome"=YES).

In an embodiment, at each repetition of the time-series analysis, the recent time interval is incremented by a regular or standard time period ("rate"). In one version, at the initial occurrence of step 210, the predictive model is applied to current values of model variables. Thereafter, the predictive model is applied to values in the recent past, starting with (standard time increment×1), (standard time increment×2), (standard time increment×3), etc. For example, if the rate for the time-series analysis were one hour, following the initial occurrence of step 210 the predictive model would be applied to values of model variables within the last hour, then to model variables within the last two hours, then to model variables within the last three hours, etc. In this embodiment, the rate of the standard time increment can be selected depending on specifics of the model, i.e., shorter time periods for dynamic short term models and longer time periods for longer term models.

If at step 212, at least one of the outcome predictions satisfies the favorable outcome criteria included in the predictive model, at step 216 the method routes the customer call to the call routing option (contact center agent) that satisfies the favorable outcome criterion. If at step 216 more than one contact center agent satisfies the favorable outcome criterion, as between these call center agents the call is routed to the contact center agent with the maximum outcome prediction. The method 200 then ends.

This method of routing a customer to a call agent via dynamic calculation of outcome predictions provides significant advantages. First, it improves the reliability of selecting a given call routing option, by providing flexible time frames for calculating outcome predictions. These flexible time frames can be critical to reliably satisfying the favorable outcome criterion, since a key value or instance of a dynamic model variable critical to a favorable outcome may have occurred at different points in time in the past.

Second, this method expedites routing the identified customer to a selected agent. The method only calculates outcome predictions based upon different values of dynamic model variables until it finds a time frame (i.e., a dynamically adjusted recent time interval) for which the calculation of outcome predictions identifies an outcome prediction for one of the call routing options that satisfies the favorable outcome criterion. As a result, the method can significantly reduce time required to query data and execute data-analysis algorithms.

Figure 3:
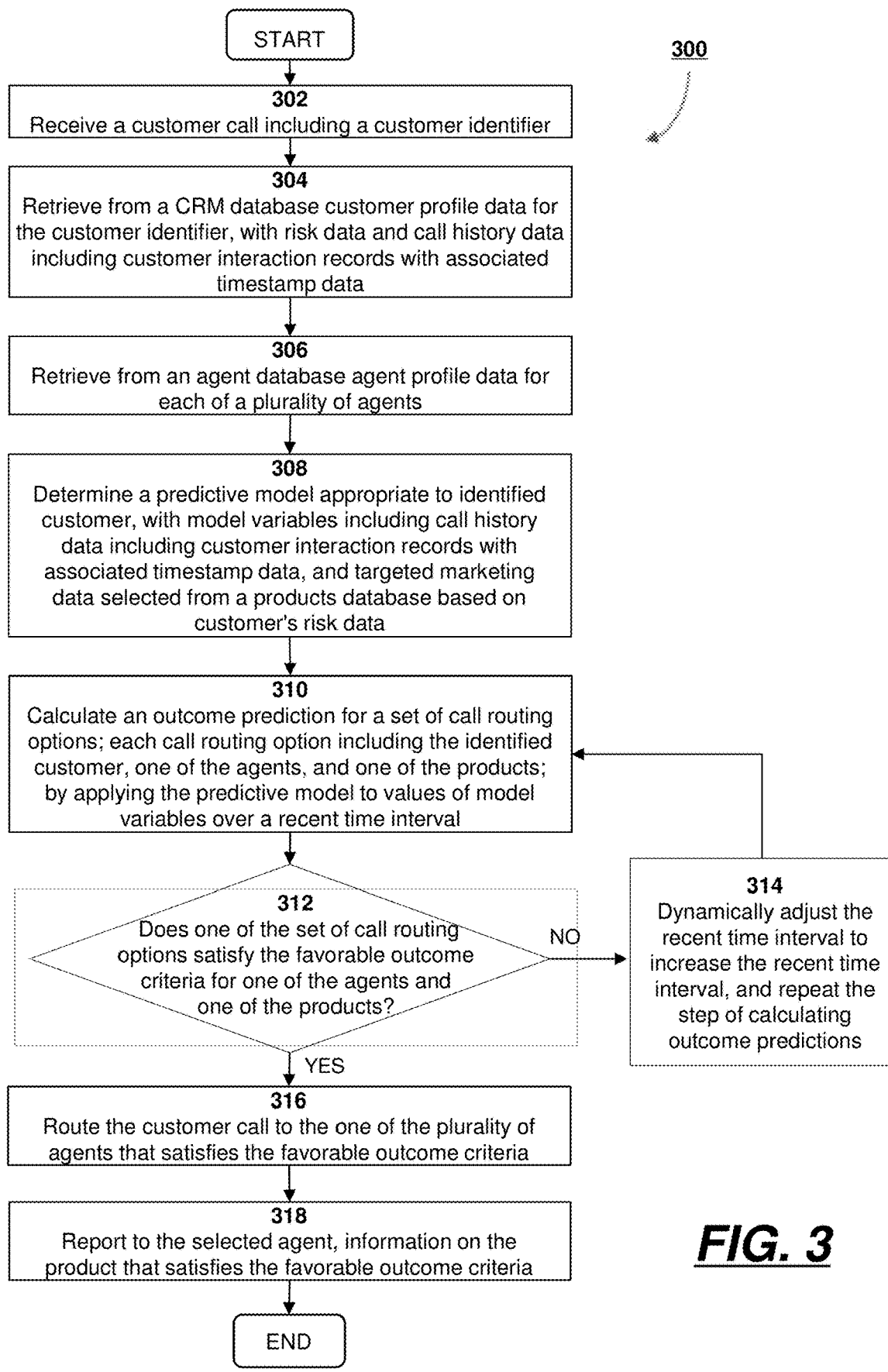
FIG. 3 illustrates a method for routing a customer call to an agent together with information on a product selected for an identified customer.

FIG. 3 is a flowchart showing a call management process 200 for automatically assigning or routing an inbound call from a customer to one of a plurality of agents at a contact center, according to an exemplary embodiment. Process 300 of FIG. 3 is generally similar to process 200 of FIG. 2, in that if the process determines that one of the call routing options satisfies a favorable outcome criterion, the process routes the inbound call to the agent associated with the successful call routing option. However, in the process 300, each call routing option includes, in addition to the identified customer and one of the contact center agents, one of a set of products selected from a products database of the contact center, such as products database 128. In addition to routing the call to the selected agent, the process 300 reports to that agent, information on one of the products that satisfies a favorable outcome criterion.

Steps 302, 304, and 306 of process 300 generally correspond to steps 202, 204, and 206 of process 200. Step 308 may differ from step 208 in that the predictive model of step 308 includes favorable outcome criteria that take into account not only the call center agent that is best qualified to handle the call from the identified customer, but also the product that is most suitable for discussion during that call. The selected product may be apparent based on the customer's expressed interest in a given product, or it may require analysis (e.g., a product for the agent to "cross-sell" to an existing customer, wherein the product is analyzed as suitable for addressing needs of that customer).

Step 310 is generally similar to step 210 as described above, in that the method calculates an outcome prediction for a set of call routing options by applying the predictive model determined at step 208, to values of model variables. However, in step 310, each call routing option includes the identified customer, one of the agents, and one of the products. In applying the predictive model to values of the model variables over the recent time interval, step 310 calculates an outcome prediction for each call routing option that also includes outcomes relating to the one of the products included in that call routing option. For example, there can be several call routing options involving the same call center agent but different products, and there may be different outcome predictions that can favor one of the products over the others for that agent.

Step 312 is similar to step 212, except that in determining whether one of the call routing options satisfies the favorable outcome criteria, this determination is made for both one of the agents and one of the products. Step 314 ("one of the calculated outcome predictions satisfies the favorable outcome"=NO) corresponds to step 214, and may employ various embodiments for dynamically adjusting recent time intervals in time-series analysis, as discussed above. Step 316 ("one of the calculated outcome predictions satisfies the favorable outcome"=YES) is generally similar to step 216. As compared with the method 200, method 300 includes an additional step 318. In routing the call to the selected agent, the method reports to the selected agent information on the product that satisfies the favorable outcome criteria. For example, in the system 100 of FIG. 1, the analytical engine 112 may instruct the routing and reporting module 116 both to route the call to a given agent device (e.g., agent device 122), and to send to that agent device a report that includes information on the product that was determined at 312 to satisfy the favorable outcome criteria. The method 300 then ends.

Figure 4:
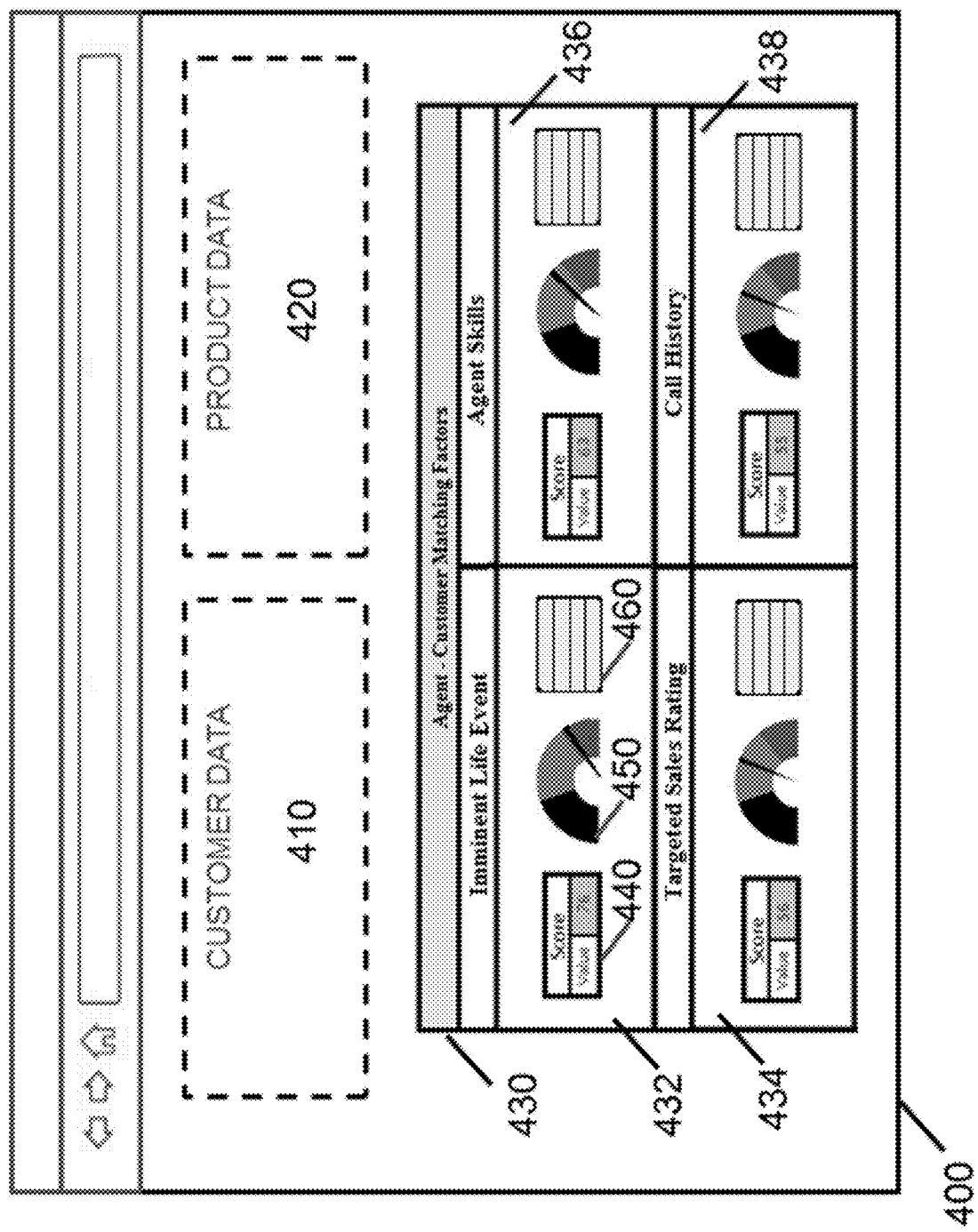
FIG. 4 is a representative view of user interface of an agent's device, upon routing an identified customer to the agent with information on a product selected for that customer.

FIG. 4 shows in somewhat schematic form a user interface 400 of an agent's device, also herein called customer service dashboard 400, upon routing an identified customer to a selected agent. Besides information conventionally provided by call center CRM systems, customer service dashboard 400 provides the selected agent with information based upon the analysis of the present method used for selecting the agent to receive the call, in order to assist the agent in effectively handling the call. User interface 400 includes customer data pane 410 providing information on an identified customer routed to that agent. Customer data 410 may include information on the identified customer that was significant in routing the call to the selected agent. Customer data pane 410 also may display scripts for the agent to obtain additional customer profile data from the customer. Product data pane 420 displays information on the product that was determined to satisfy favorable outcome criteria, e.g., in the method 300 of FIG. 3. Displayed product data 420 may include information that was significant in selecting that product.

In addition, window 430 of the customer service dashboard includes panes 432, 434, 436 and 438, each with graphics and information on various Agent-Customer Matching Factors that were most important in selecting the particular Agent and Product for routing. The illustrated Agent-Customer Matching Factors include Imminent Life Event (pane 432), Agent Skills (pane 436), Targeted Sales Rating (pane 434), and Call History (pane 438). Each pane includes a score value 440 of the respective Agent-Customer Matching Factor, e.g., a percentage (scores 76, 67, 56, and 55 respectively). A meter indicator icon 450 has a pointer position corresponding to the score. A menu box 640 can display detailed aspects of each Agent-Customer Matching Factor considered by the predictive model in weighting that factor in selecting the agent and product that satisfied the favorable outcome criteria. Customer service dashboard data on preeminent Agent-Customer Matching Factors, with underlying details, can provide useful insights to the selected agent in servicing the customer.

While various aspects and embodiments have been disclosed, other aspects and embodiments are contemplated. The various aspects and embodiments disclosed are for purposes of illustration and are not intended to be limiting, with the true scope and spirit being indicated by the following claims.

The foregoing method descriptions and the interface configuration are provided merely as illustrative examples and are not intended to require or imply that the steps of the various embodiments must be performed in the order presented. As will be appreciated by one of skill in the art the steps in the foregoing embodiments may be performed in any order. Words such as "then," "next," etc. are not intended to limit the order of the steps; these words are simply used to guide the reader through the description of the methods. Although process flow diagrams may describe the operations as a sequential process, many of the operations can be performed in parallel or concurrently. In addition, the order of the operations may be re-arranged. A process may correspond to a method, a function, a procedure, a subroutine, a subprogram, etc. When a process corresponds to a function, its termination may correspond to a return of the function to the calling function or the main function.

The various illustrative logical blocks, modules, circuits, and algorithm steps described in connection with the embodiments disclosed here may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The actual software code or specialized control hardware used to implement these systems and methods is not limiting of the invention. Thus, the operation and behavior of the systems and methods were described without reference to the specific software code being understood that software and control hardware can be designed to implement the systems and methods based on the description here.

When implemented in software, the functions may be stored as one or more instructions or code on a non-transitory computer-readable or processor-readable storage medium. The steps of a method or algorithm disclosed here may be embodied in a processor-executable software module which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used here, include compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

What is claimed is:

1. A processor-based method, comprising:
    upon receiving a customer call at a call receiving device from a customer, the customer call including a customer identifier,
        retrieving, by a processor, customer data comprising one or more customer interaction records including timestamp data associated with each customer interaction record;
        retrieving, by the processor from an agent database, agent profile data for each of a plurality of agents;
        executing, by the processor, a predictive model for the customer, the predictive model including model variables comprising the customer data comprising the one or more customer interaction records including timestamp data associated with each customer interaction record;
        calculating, by the processor, an outcome prediction for each of a set of call routing options by applying the predictive model to values of the model variables over a recent time interval, wherein the recent time interval is a historical time period ending at a current time, wherein each call routing option comprises the customer and one of the plurality of agents; and
        determining, by the processor, whether the respective outcome prediction calculated for each of the set of call routing options satisfies a favorable outcome criterion;
            in the event none of the outcome predictions calculated for the set of call routing options satisfies the favorable outcome criterion, dynamically adjusting, by the processor, the recent time interval, and repeating the calculating step and determining step by applying the predictive model to values of the model variables over the dynamically adjusted time interval; and
            in the event the outcome prediction calculated for the one of the set of call routing options satisfies the favorable outcome criterion, directing, by the processor, the call receiving device to route the customer call to the one of the plurality of agents comprised in the one of the set of call routing options.

2. The method as defined in claim 1, wherein the dynamically adjusting the recent time interval increases the recent time interval by increasing the historical time period ending at the current time.

3. The method as defined in claim 2, wherein the dynamically adjusting the recent time interval effects a time-series analysis in which the recent time interval is increased by a standard rate.

4. The processor-based method according to claim 1, wherein the customer data comprises customer profile data associated with the customer, and call history data comprising the one or more customer interaction records including timestamp data associated with each customer interaction record, wherein the model variables comprise the customer profile data and the call history data.

5. The processor-based method according to claim 4, wherein the customer profile data includes one or more risk estimate for the customer, further comprising the step, following the step of directing the call receiving device to route the customer call, of communicating to the one of the plurality of agents a call script for improving the one or more risk estimate for the identified customer.

6. The processor-based method according to claim 1, further comprising the step of determining targeted marketing data associated with one or more product selected from a products database, wherein the targeted marketing data associated with the one or more product selected from a products database include associated timestamp data.

7. The processor-based method according to claim 6, wherein in the calculating step, each call routing option comprises the customer, the one of the plurality of agents, and one of the one or more product selected from the products database.

8. The processor-based method according to claim 6, further comprising the step, following the step of directing the call receiving device to route the customer call, of reporting to the one of the plurality of agents comprised in the one of the set of call routing options, information on the targeted marketing data associated with the one of the one or more product selected from the products database.

9. The processor-based method according to claim 1, wherein in the step of executing the predictive model, the predictive model is a Markov model.

10. The processor-based method according to claim 1, wherein in the step of executing the predictive model, the model variables in the predictive model are selected using a random-forests learning method.

11. The processor-based method according to claim 1, further comprising the step, following the step of directing the call receiving device to route the customer call, of reporting to the one of the plurality of agents comprised in the one of the set of call routing options, information on one or more of the model variables having a largest effect on the outcome prediction calculated for the one of the set of call routing options.

12. A processor-based method, comprising:
  upon receiving a customer call at a call receiving device, the customer call including a customer identifier for an identified customer,
    retrieving, by a processor, customer profile data associated with the identified customer, and call history data comprising one or more customer interaction records including timestamp data associated with each customer interaction record;
    retrieving, by the processor from an agent database, agent profile data for each of a plurality of agents;
    selecting, by the processor, a predictive model appropriate to the identified customer, the predictive model including model variables comprising the call history data comprising the one or more customer interaction records including timestamp data associated with each customer interaction record, and targeted marketing data associated with one or more product selected from a products database;
    calculating, by the processor, an outcome prediction for each of a set of call routing options by applying the selected predictive model to values of the model variables over a recent time interval, wherein the recent time interval is a historical time period ending at a current time, wherein each call routing option comprises the identified customer, the one of the plurality of agents, and one of the one or more product selected from the products database; and
    determining, by the processor, whether the respective outcome prediction calculated for each of the set of call routing options satisfies a favorable outcome criterion;
    in the event none of the outcome predictions calculated for the set of call routing options satisfies the favorable outcome criterion, dynamically adjusting, by the processor, the recent time interval to increase the recent time interval by increasing the historical time period ending at the current time, and repeating the calculating step and determining step by applying the predictive model to values of the model variables over the increased recent time interval; and
    in the event the outcome prediction calculated for the one of the set of call routing options satisfies the favorable outcome criterion, directing, by the processor, the call receiving device to route the customer call to the one of the plurality of agents comprised in the one of the set of call routing options, and reporting to the one of the plurality of agents information on the one of the one or more product comprised in the one of the set of call routing options.

13. The processor-based method according to claim 12, wherein the targeted marketing data associated with the one or more product selected from a products database include associated timestamp data.

14. The processor-based method according to claim 12, further comprising the step, following the step of directing the call receiving device to route the customer call, of reporting to the one of the plurality of agents comprised in the one of the set of call routing options, information on the targeted marketing data associated with the one of the one or more product comprised in the one of the set of call routing options.

15. The processor-based method according to claim 12, wherein in the step of selecting the predictive model, the predictive model is a Markov model.

16. The processor-based method according to claim 12, wherein in the step of selecting the predictive model, the model variables in the predictive model are selected using a random-forests learning method.

17. The processor-based method according to claim 12, wherein the dynamically adjusting effects a time-series analysis in which the recent time interval is increased by a standard rate.

18. A system, comprising:
a call-receiving device for receiving a customer call from a customer;
a non-transitory machine-readable memory that stores agent profile data for a plurality of agents and customer profile data associated with a plurality of customers;
a predictive models module that stores a plurality of predictive models; and
a processor, configured to execute a call routing module, wherein the processor in communication with the non-transitory machine-readable memory and the predictive models module executes a set of instructions instructing the processor to:
 upon receiving the customer call at the call-receiving device from the customer,
  retrieve from the non-transitory machine-readable memory, customer profile data associated with the customer and call history data comprising one or more customer interaction records including timestamp data associated with each customer interaction record;
  retrieve from the non-transitory machine-readable memory, agent profile data for each of the plurality of agents;
  select a predictive model appropriate to the customer, the predictive model including model variables comprising the call history data including timestamp data associated with each customer interaction record;
  calculate an outcome prediction for each of a set of call routing options by applying the selected predictive model to values of the model variables over a recent time interval, wherein the recent time interval is a historical time period ending at a current time, wherein each call routing option comprises the customer and one of the plurality of agents; and
  determine whether the respective outcome prediction calculated for each of the set of call routing options satisfies a favorable outcome criterion;
   in the event none of the outcome predictions calculated for the set of call routing options satisfies the favorable outcome criterion, dynamically adjust the recent time interval and repeat the calculate and determine steps by applying the predictive model to values of the model variables over the dynamically adjusted time interval; and
   in the event the outcome prediction calculated for the one of the set of call routing options satisfies the favorable outcome criterion, direct the call receiving device to route the customer call to the one of the plurality of agents comprised in the one of the set of call routing options.

19. The system as defined in claim 18, wherein the dynamically adjusting the recent time interval increases the recent time interval by increasing the historical time period ending at the current time.

20. The system as defined in claim 19, wherein the dynamically adjusting the recent time interval effects a time-series analysis in which the recent time interval is increased by a standard rate.

* * * * *